(12) United States Patent
Taniguchi et al.

(10) Patent No.: US 7,614,137 B2
(45) Date of Patent: Nov. 10, 2009

(54) METHOD OF MANUFACTURING A MAGNETIC SLIDER HEAD

(75) Inventors: Yoshihiro Taniguchi, Kanagawa (JP); Yoshinori Takeuchi, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 387 days.

(21) Appl. No.: 11/481,521

(22) Filed: Jul. 5, 2006

(65) Prior Publication Data

US 2007/0008651 A1 Jan. 11, 2007

(30) Foreign Application Priority Data

Jul. 11, 2005 (JP) ............... 2005-201215

(51) Int. Cl.
*G11B 5/127* (2006.01)
*H04R 31/00* (2006.01)

(52) U.S. Cl. ............... 29/603.12; 29/603.03; 29/603.1; 29/603.16; 29/603.18; 156/268; 156/344; 360/230; 360/237.1; 438/455; 438/458; 438/976

(58) Field of Classification Search ............ 29/603.03, 29/603.1, 603.12; 360/230–237.1; 156/268, 156/344; 438/455, 458, 976
See application file for complete search history.

(56) References Cited

U.S. PATENT DOCUMENTS 6,483,667 B1 * 11/2002 Berg et al. ............... 360/235.6
6,597,536 B2    7/2003 Tsuchiyama et al.
7,408,741 B2 *  8/2008 Agari et al. ............... 360/235.8
2005/0135012 A1 * 6/2005 Kubotera ................. 360/236.3

FOREIGN PATENT DOCUMENTS

JP    2000-260015    9/2000
JP    2001-216618    8/2001
JP    2001-297421    10/2001

* cited by examiner

*Primary Examiner*—Paul D Kim
(74) *Attorney, Agent, or Firm*—Townsend and Townsend and Crew LLP; Rambod Nader

(57) ABSTRACT

Embodiments of the invention relate to manufacturing method of a magnetic head slider which flies stably even with a reduced peripheral speed resulting from a trend toward a magnetic disk having a smaller diameter. According to one embodiment, a method of manufacturing a magnetic head slider comprises forming a leading side rail surface and a trailing side rail surface, a leading stepped bearing surface and a trailing stepped bearing surface, and a negative-pressure groove surface on an air bearing surface through etching, forming a first stepped surface on the leading side rail surface through sputtering, and forming a second stepped surface by forming a carbon layer on the first stepped surface through sputtering. The first stepped surface has a first height with respect to the leading side rail surface and the second stepped surface has a second height with respect to the first stepped surface.

12 Claims, 6 Drawing Sheets

METHOD OF MANUFACTURING A MAGNETIC SLIDER HEAD

CROSS-REFERENCES TO RELATED APPLICATIONS

This application claims priority from Japanese Patent Application No. JP2005-201215, filed Jul. 11, 2005, the entire disclosure of which is incorporated herein by reference.

BACKGROUND OF THE INVENTION

The present invention relates to a magnetic head slider capable of maintaining a stable fly height even with a peripheral speed reduced due to the reduction in diameter of a magnetic disk, and a manufacturing method therefor.

A magnetic disk drive uses a magnetic head slider that flies above a spinning magnetic disk recording medium (magnetic disk), while maintaining a microscopic distance (a flying height) therefrom. The magnetic disk drive is required to make the magnetic head slider fly in a low flying state, in which the magnetic head slider is as close as possible to the magnetic disk, in order to increase storage capacity. To achieve such a stringent requirement for the low flying height, a negative pressure type magnetic head slider is currently used. The negative pressure type magnetic head slider offers outstanding flying stability by making use of negative pressure acting on the slider to attract the slider onto the magnetic disk.

The slider disclosed in Patent Document 1 (Japanese Patent Laid-open No. 2000-260015) is well-known, wherein the slider includes micro-protrusions disposed on an air bearing surface thereof, each being independent of each other on the air bearing surface. The micro-protrusions are intended to allow a magnetic head included in the slider to be proximate to a smooth magnetic disk surface with a gap of substantially zero therebetween. Each of the micro-protrusions has a diameter of about 1 μm or less as measured in a slider traveling direction. The total area of vertices of all micro-protrusions is 0.02 mm² or less.

The magnetic head slider disclosed in Patent Document 2 (Japanese Patent Laid-open No. 2001-297421) is arranged to keep the flying height substantially uniform throughout the entire magnetic disk surface, reduce variations in the flying height at high altitudes, and let the head slider glide smoothly in contact with the magnetic disk should the slider contact the magnetic disk. To achieve these ends, the magnetic head slider includes a magnetic head mounting surface, a slider rail surface, a slider stepped bearing surface, and a negative-pressure groove. The magnetic head mounting surface forms a first surface disposed proximately to the magnetic disk. The slider rail surface forms a second surface disposed further away from the magnetic disk than the magnetic head mounting surface. The slider stepped bearing surface forms a third surface disposed further away from the magnetic disk than the slider rail surface. The negative-pressure groove forms a fourth surface disposed the farthest away from the magnetic disk.

Conventional magnetic disk drives have had a large housing, allowing a magnetic disk used therewith to have a sufficiently large diameter and thus spin at a sufficiently high speed. This in turn has allowed the magnetic head slider flying above the surface of the magnetic disk to generate a sufficiently large lifting force so as to achieve a stable flying height. In recent years, however, the size of the magnetic disk drive has been progressively reduced because of a trend toward adopting magnetic disk drives in portable devices, and the like. Because the peripheral speed becomes lower for the magnetic disks having smaller diameters, therefore, it is becoming more difficult to achieve a sufficient flying force of the magnetic head slider. Accordingly, a need arises for a magnetic head slider that generates a sufficient lifting force even with a reduced peripheral speed of the magnetic disk and maintains a stable fly height.

BRIEF SUMMARY OF THE INVENTION

The techniques of the prior art described above are intended for reducing or making uniform the flying height. The techniques, however, do not address whatsoever the problem of the reduced lifting force generated by the magnetic head slider due to the slower peripheral speed which results from the trend toward smaller diameters of the magnetic disks. The magnetic head sliders of the prior art do not solve this problem.

The present invention has been made to solve the foregoing problem. It is therefore a feature of the present invention to provide a magnetic head slider capable of generating a large lifting force even with a reduced peripheral speed of a magnetic disk.

It is another feature of the present invention to provide a manufacturing method for the magnetic head slider.

A magnetic head slider according to an embodiment of the present invention is characterized in that a leading side rail surface includes a first stepped surface and a second stepped surface that continues from the first stepped surface. A typical magnetic head slider includes a leading edge, a trailing edge, and an air bearing surface. The air bearing surface includes a plurality of leading side rail surfaces, a trailing side rail surface disposed in the same plane as the leading side rail surfaces and having a magnetic head mounted thereon, a stepped bearing surface having a predetermined depth δ1 from the leading side rail surfaces, and a negative-pressure groove surface having a depth δ2 that is even deeper than the stepped bearing surface. The leading side rail surfaces include the first stepped surface having a predetermined height h1 and the second stepped surface having a predetermined height h2 disposed on the first stepped surface.

According to the present invention, it is possible to generate a large lifting force for the magnetic head slider and thereby achieve a stable fly height of the magnetic head slider even with a reduced peripheral speed resulting from the trend toward magnetic disks having smaller diameters. Furthermore, it is possible to provide a manufacturing method for the magnetic head slider.

DETAILED DESCRIPTION OF THE INVENTION

Figure 3:
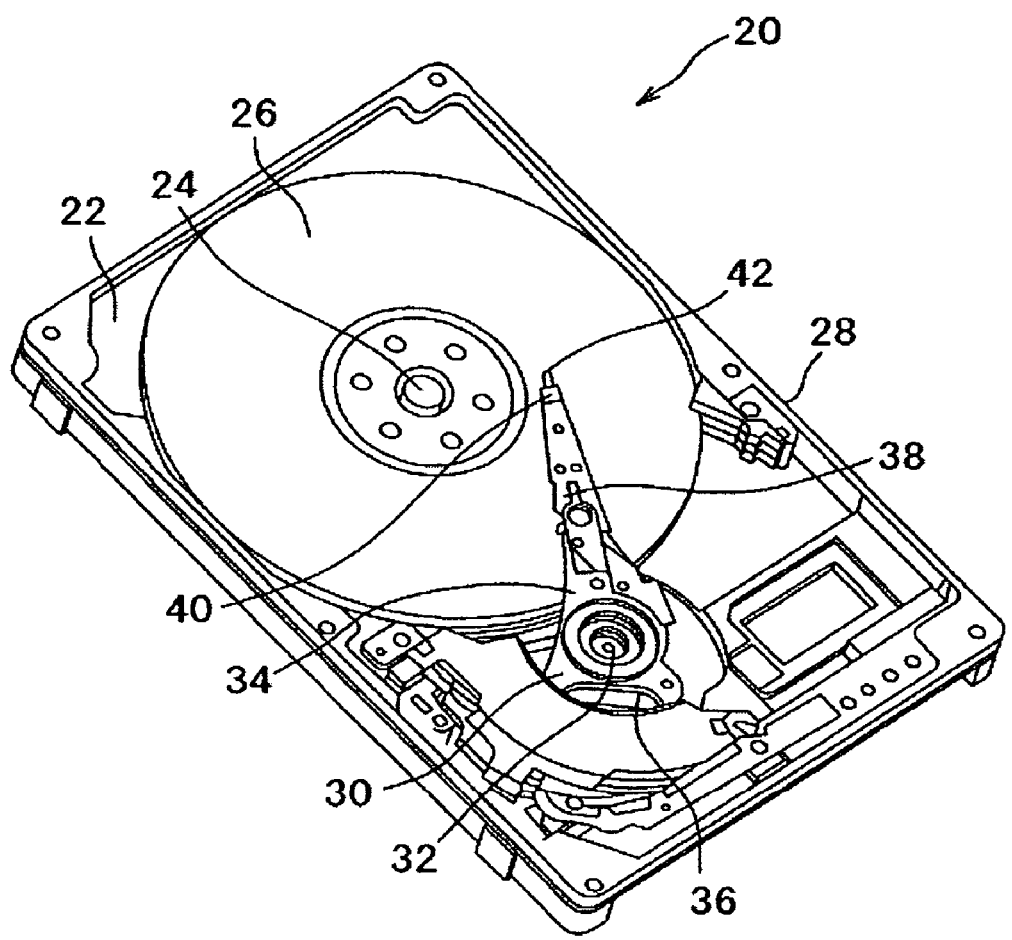
FIG. 3 is a view showing a general construction of a magnetic disk drive, in which a magnetic head slider is mounted.

Specific embodiments to which the present invention is applied will be described below with reference to the accompanying drawings. A general construction of a magnetic disk drive, in which a magnetic head slider is mounted, will be first described with reference to FIG. 3. A magnetic disk drive 20 includes a base 22, a spindle motor 24 fixed to the base 22, and an actuator 30. The spindle motor 24 is mounted with at least one magnetic disk 26. The actuator 30 includes a head arm 34 that swings about a pivot 32 and a voice coil motor (VCM) 36. One end of a suspension 38 is mounted on the head arm 34, while a magnetic head slider 40 is mounted on the other end of the suspension 38. A lift tab 42 is formed at a leading end of the other end of the suspension 38. In addition, a load/unload mechanism 28 is secured to the base 22. When current is passed through the VCM 36, the head arm 34 swings about the pivot 32. This correctly locates the magnetic head slider 40 mounted on the suspension 38 at any arbitrary position in a radial direction of the magnetic disk 26 so that data is written or read. When reading or writing of data is completed or a power of the magnetic disk drive 20 is shut down, the magnetic head slider 40 is driven by the VCM 36 so that the lift tab 42 climbs up a ramp slope of the load/unload mechanism 28 to reach a retraction region.

Figure 1:
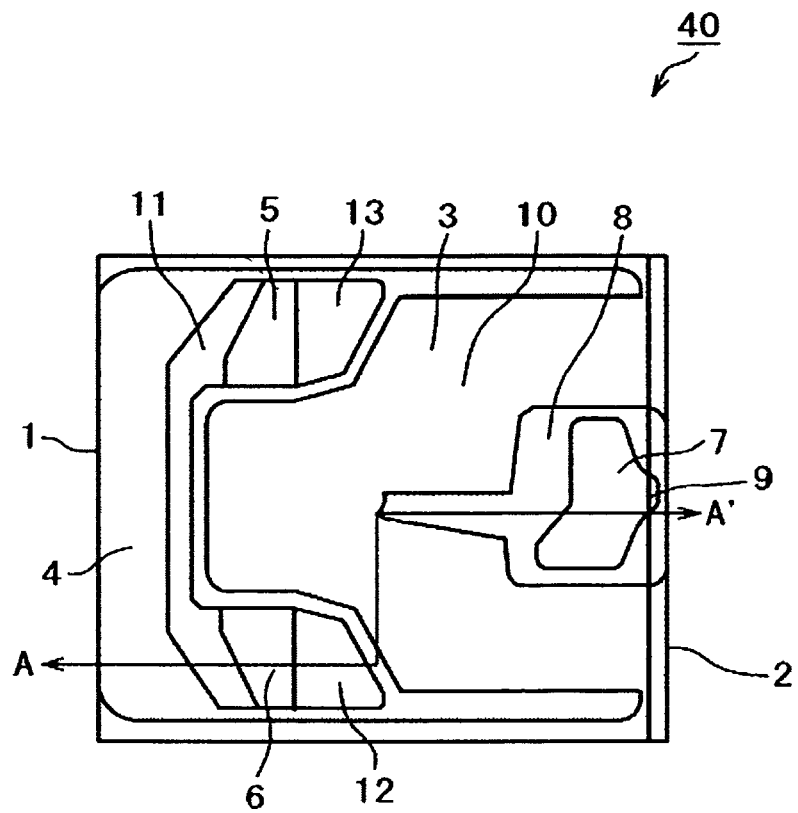
FIG. 1 is a plan view showing a magnetic head slider according to a first embodiment of the present invention.
Figure 2:
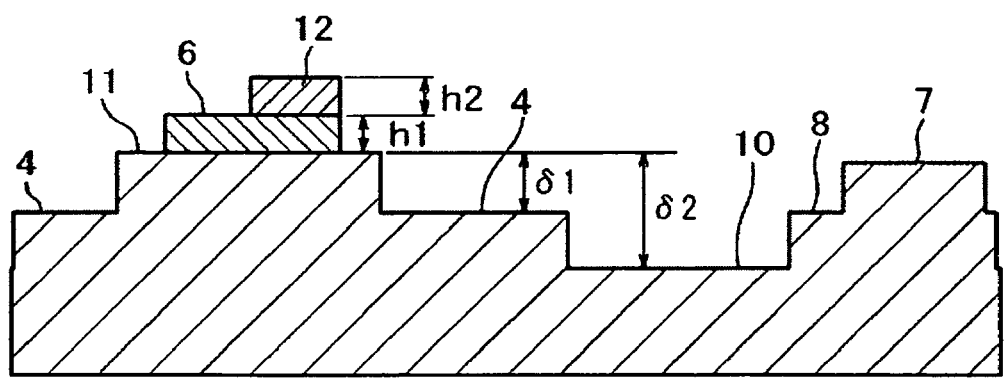
FIG. 2 is a cross-sectional view taken along line A-A' of FIG. 1.

The magnetic head slider according to an embodiment of the present invention will be described in detail below. FIG. 1 is a plan view showing the magnetic head slider 40 according to a first embodiment of the present invention as viewed from the side of the air bearing surface. FIG. 2 is a cross-sectional view taken along line A-A' of FIG. 1. The magnetic head slider 40 includes a leading edge 1, a trailing edge 2, and an air bearing surface 3. The magnetic head slider 40 is a so-called pico slider measuring 1.25 mm long×1 mm wide×0.3 mm thick. The air bearing surface 3 includes a leading stepped bearing surface 4, a leading side rail surface 11, a trailing side rail surface 7, a trailing stepped bearing surface 8, a negative-pressure groove surface 10, first stepped surfaces 5, 6, and second stepped surfaces 12, 13. The trailing side rail surface 7 includes a magnetic head 9. The first stepped surfaces 5, 6 and the second stepped surfaces 12, 13 are formed on the leading side rail surface 11.

The leading stepped bearing surface 4 has a depth (step) of $\delta 1$ from the leading side rail surface 11. The negative-pressure groove surface 10 has a depth (step) of $\delta 2$ from the trailing side rail surface 11. The first stepped surfaces 5, 6 have a height (step) of h1 from the leading side rail surface 11. The second stepped surfaces 12, 13 have a height of h2 (step) from the first stepped surfaces 5, 6. The leading side rail surface 11 and the trailing side rail surface 7 are on the same level. The leading side rail surface 11 and the trailing side rail surface 7 act as what is called a positive pressure rail surface. The positive pressure rail surface generates pressure using an air stream flowing through a gap between the magnetic head slider 40 and the magnetic disk 26. The positive pressure rail surface thereby makes the magnetic head slider 40 fly above the magnetic disk 26. The leading stepped bearing surface 4 and the trailing stepped bearing surface 8 are in plane of the same height. A depth from the leading side rail surface 11 or the trailing side rail surface 7 is about 200 nm.

An air stream (not shown) flowing from the side of the leading edge 1 is compressed, and the pressure thereof is boosted, by the step $\delta 1$ between the leading stepped bearing surface 4 and the leading side rail surface 11. The air stream is then compressed, and the pressure thereof is built up, by the step h1 between the leading side rail surface 11 and the first stepped surfaces 5, 6. There is then generated a high pressure. The air stream is further compressed, and the pressure thereof is further boosted, by the step h2 between the first stepped surfaces 5, 6 and the second stepped surfaces 12, 13. An even higher pressure is thereby created. As such, a large lifting force can be generated by providing the two stepped surfaces of the first stepped surfaces 5, 6 and the second stepped surfaces 12, 13 in the magnetic head slider having the same outline.

Figure 4:
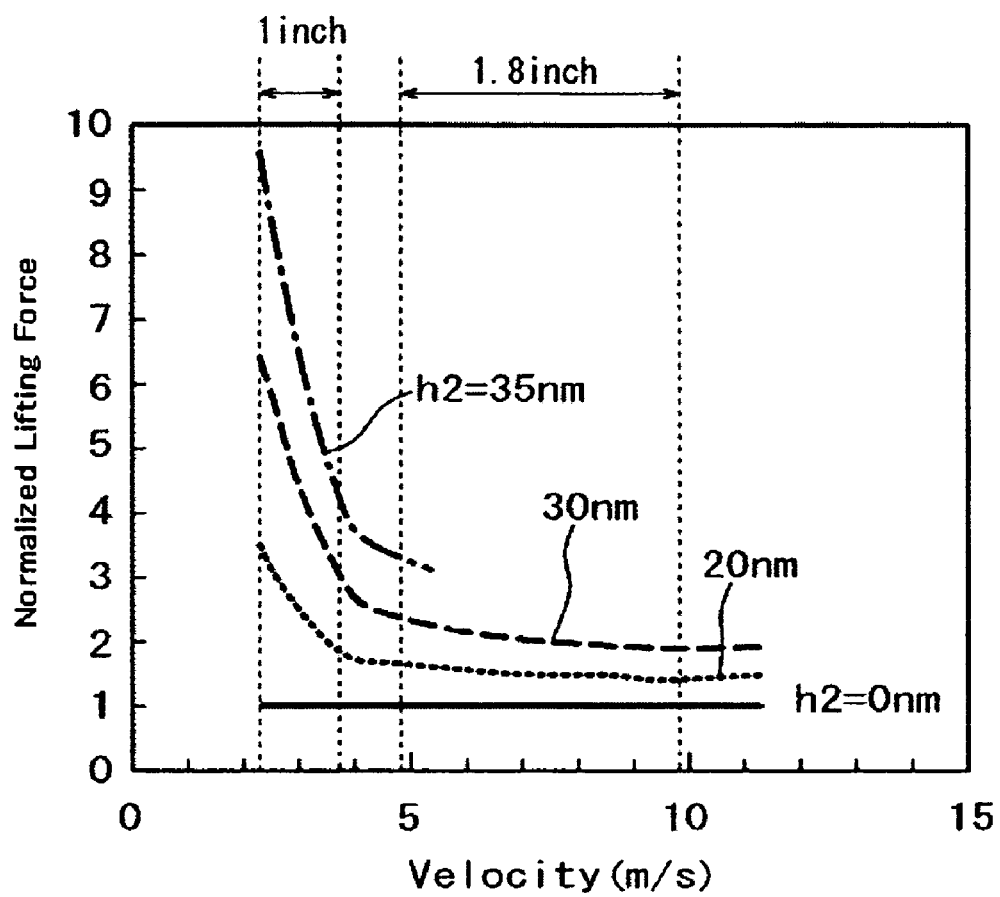
FIG. 4 is a chart showing a relationship between a peripheral speed of a magnetic disk and a lifting force, representing an effect achieved by the first embodiment of the present invention.

FIG. 4 is a chart showing an increase in the lifting force as calculated when the height h2 of the second stepped surfaces 12, 13 is varied with the height h1 of the first stepped surfaces 5, 6 fixed at 30 nm in the magnetic head slider 40 according to the first embodiment of the present invention. Values on the ordinate of the chart represent normalized lifting forces when the lifting force generated only with the first stepped surfaces 5, 6 is 1. The abscissa of the chart represents a peripheral speed of the magnetic disk 26 (magnetic head slider 40). The chart shows the normalized lifting forces when the height h2 of the second stepped surfaces 12, 13 is varied among 0, 20, 30, and 35 nm. The chart tells that providing the second stepped surfaces 12, 13 in addition to the first stepped surfaces 5, 6 contributes to a greater lifting force as compared with the case of providing only the first stepped surfaces 5, 6. The chart also indicates that the slower the peripheral speed, the greater the lifting force. This indicates that the arrangement of the second stepped surfaces 12, 13 produces a great effect on the peripheral speed reduced due to reduction in the magnetic disk size. From a qualitative viewpoint, the ratio of the height (h2) of the second stepped surfaces 12, 13 to the height (h1) of the first stepped surfaces 5, 6 (h2/h1) is preferably set to about 3 or less. This is because the ratio of height of about 2 to 3 results in the lifting force being the greatest. Any ratio greater than about 2 to 3 decreases the lifting force.

Figure 5:
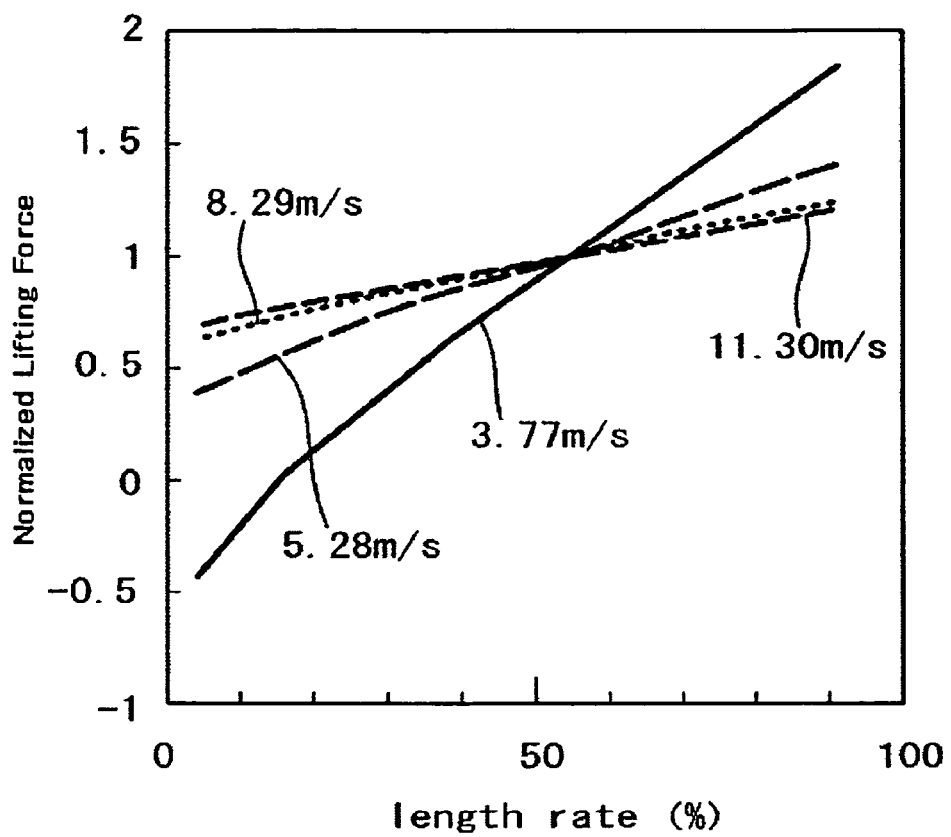
FIG. 5 is a chart showing a relationship between a ratio of the length of a second stepped surface to the length of a first stepped surface and the lifting force.

FIG. 5 is a chart showing an increase in the lifting force as calculated when a length (L2) of the second stepped surfaces 12, 13 is varied with a length (L1) of the first stepped surfaces 5, 6 fixed in the magnetic head slider 40 according to the first embodiment of the present invention. Values on the ordinate of the chart represent normalized lifting forces when the length of the second stepped surfaces 12, 13 is taken as 1 when the same is 54% of the length of the first stepped surfaces 5, 6. The abscissa of the chart represents a ratio of the length of the second stepped surfaces 12, 13 to the length of the first stepped surfaces 5, 6. The chart shows the normalized lifting forces when the peripheral speed of the magnetic disk 26 (magnetic head slider 40) is varied among 11.30, 8.29, 5.28, and 3.77 m/s. The chart tells that elongating the second stepped surfaces 12, 13 contributes to a greater lifting force. The chart also indicates that the slower the peripheral speed, the smaller the lifting force. To generate the lifting force by forming the second stepped surfaces 12, 13, the length of the second stepped surfaces 12, 13 needs to be about 20% or more of the length of the first stepped surfaces 5, 6. Accordingly, an expected lifting force can be obtained if a boundary of the second stepped surfaces 12, 13 with respect to the first stepped surfaces 5, 6 is situated at a position that falls within the range between about 20% and 90% from a rear end of the first stepped surfaces 5, 6.

Figure 6:
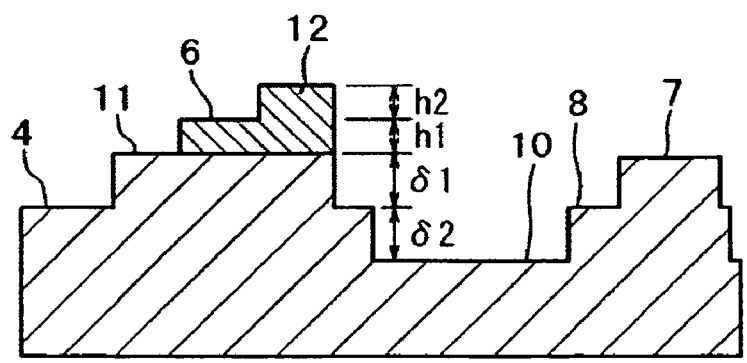
FIG. 6 is a cross-sectional view for illustrating a manufacturing method of the magnetic head slider according to the first embodiment of the present invention.
Figure 7:
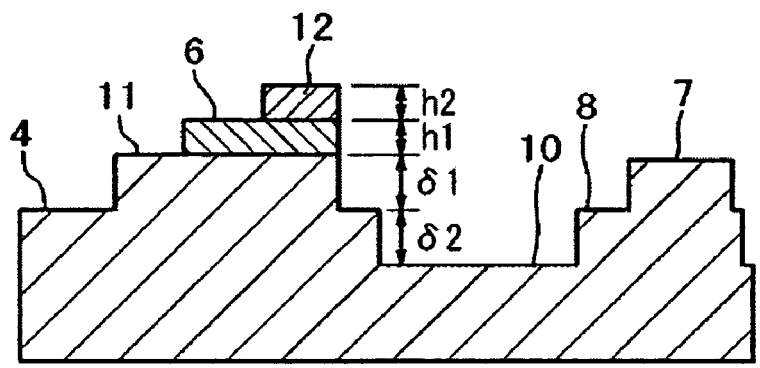
FIG. 7 is a cross-sectional view for illustrating another manufacturing method of the magnetic head slider according to the first embodiment of the present invention.

The first stepped surfaces 5, 6 and the second stepped surfaces 12, 13 may be formed by the following method. Specifically, referring to FIG. 6 which corresponds to FIG. 2, an approx. −3-nm-thick air bearing surface protective film (not shown) is first formed on the air bearing surface 3 before machining the magnetic head slider 40. Then, through etching, such as ion milling or the like, the leading side rail surface 11 and the trailing side rail surface 7, the leading stepped bearing surface 4 and the trailing stepped bearing surface 8, and the negative-pressure groove surface 10 are formed. Next, a silicone tight contact layer (not shown) is formed on the leading side rail surface 11 by sputtering and a carbon layer is formed on the silicone tight contact layer to form the first stepped surface 6 (5). This is followed by formation of the second stepped surface 12 (13) by forming a carbon layer on the first stepped surface 6 (5) through sputtering. In accordance with the foregoing method, the first stepped surface 6 (5) and the second stepped surface 12 (13) are formed of the carbon layer of the same material. A different material may nonetheless be used. As shown in FIG. 7, it is appropriate that the first stepped surface 6 (5) of a silicone layer be formed on the leading side rail surface 11 through sputtering and the second stepped surface 12 (13) of a carbon layer be formed on the silicone first stepped surface 6 (5). In accordance with these methods, the magnetic head slider can be manufactured through a simple method by simply additionally forming the stepped surfaces on the leading side rail surface 11 after having formed the air bearing surface without having to modify the existing method of forming the slider air bearing surface.

A third method is to form the second stepped surface 12 (13) and the first stepped surface 6 (5) through etching, such as ion milling or the like, when the air bearing surface 3 is formed. The method flows specifically as detailed in the following. An air bearing surface protective film is first formed on the air bearing surface. The second stepped surface 12 (13) having the step h2 is formed through ion milling and then the first stepped surface 6 (5) having the step h1 from a lower portion of the second stepped surface 12 (13) is formed. Then, the leading side rail surface 11 at the depth of δ1 from a lower portion of the first stepped surface 6 (5) is formed. This is followed by formation of the negative-pressure groove surface 10 that has the depth of δ2 from a lower portion of the leading side rail surface 11 and the trailing side rail surface 7, namely, from the leading stepped bearing surface 4 and the trailing stepped bearing surface 8.

Figure 8:
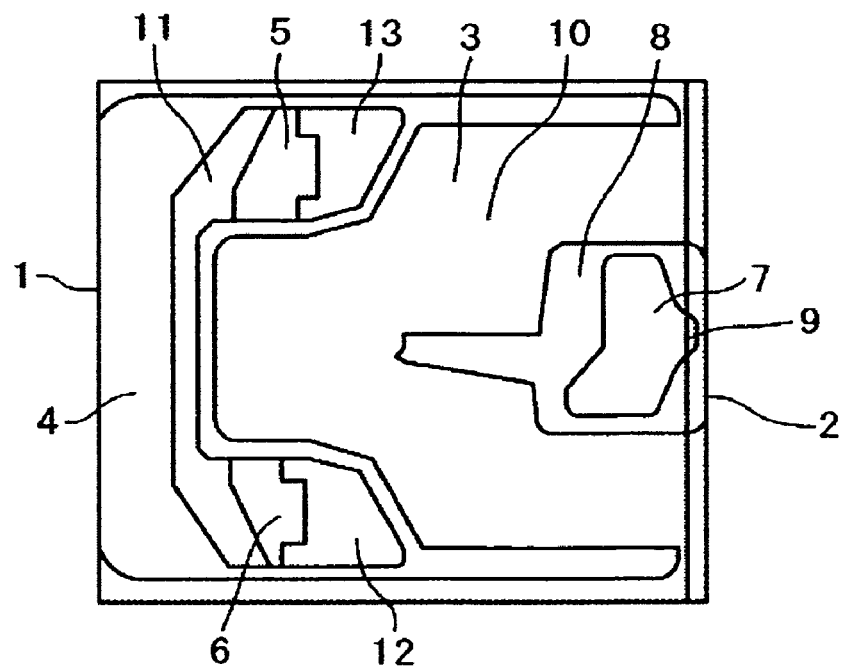
FIG. 8 is a plan view showing a magnetic head slider according to a second embodiment of the present invention.
Figure 9:
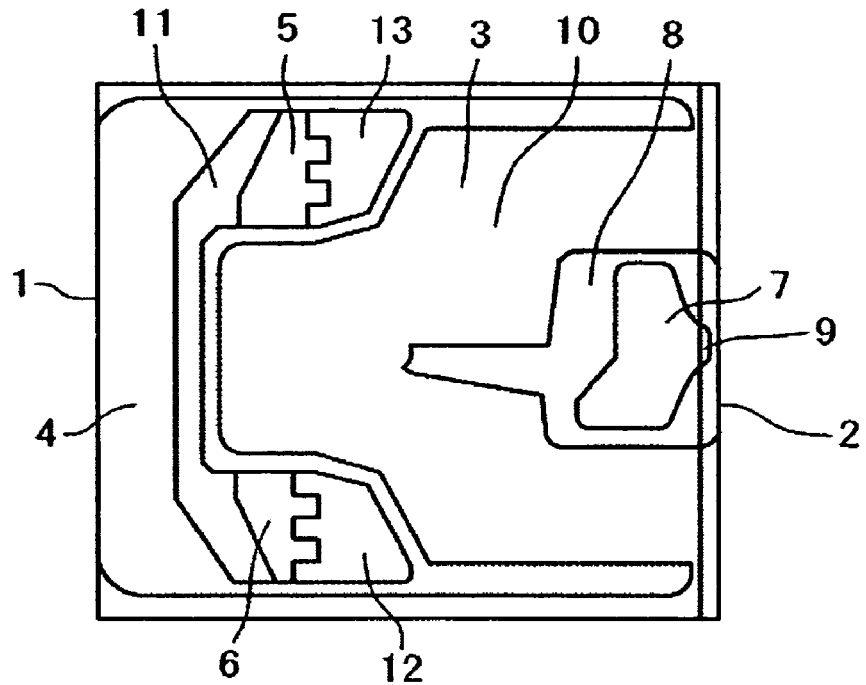
FIG. 9 is a plan view showing a magnetic head slider according to a second embodiment of the present invention.

A magnetic head slider according to a second embodiment of the present invention will be described with reference to FIGS. 8 and 9. The magnetic head slider according to the second embodiment differs from the magnetic head slider according to the first embodiment shown in FIG. 1 in the shape of the boundary between the first stepped surfaces 5, 6 and the second stepped surfaces 12, 13. In the magnetic head slider 40 according to the first embodiment of the present invention, the boundary between the first stepped surfaces 5, 6 and the second stepped surfaces 12, 13 is formed by a straight line. The shape of the boundary is not necessarily a straight line. Rather, the boundary may be U-shaped as shown in FIG. 8, toothed as shown in FIG. 9, or otherwise shaped in many varied ways. These arrangements reduce a side flow of air flowing into the second stepped surfaces 12, 13 from the first stepped surfaces 5, 6, thereby allowing an even greater lifting force to be generated.

Figure 10:
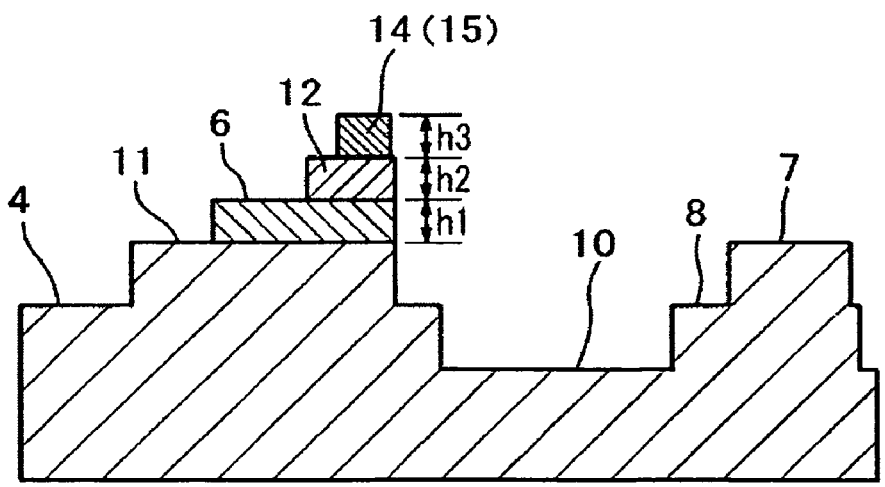
FIG. 10 is a plan view showing a magnetic head slider according to a third embodiment of the present invention.

A magnetic head slider according to a third embodiment of the present invention is shown in FIG. 10. The magnetic head slider according to the third embodiment differs from the magnetic head slider according to the first embodiment in the following point. Specifically, the magnetic head slider according to the third embodiment includes a third stepped surface 14 (15) formed, as a third step, on the second stepped surface 12 (13). It is preferable that the third stepped surface 14 (15) be formed of a carbon layer like the second stepped surface. A step h3 between the second stepped surface 12 (13) and the third stepped surface 14 (15) further compresses, and further boosts the pressure of, the air stream compressed by the step h2 between the first stepped surface 6 (5) and the second stepped surface 12 (13). An even greater lifting force than in the magnetic head slider according to the first embodiment is thereby generated.

The present invention has been described as the preferred embodiments using a pico slider measuring 1.25 mm long×1 mm wide×0.3 mm thick. It should be apparent to those skilled in the art that it is not so limited, but the present invention may be applied to a femto slider measuring 0.85 mm long×0.7 mm wide×0.23 mm thick or an even more compact slider. In particular, the present invention exhibits an outstanding effect for a reduced peripheral speed due to magnetic disks having smaller diameters and a reduced lifting force due to smaller magnetic head sliders.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method of manufacturing a magnetic head slider, comprising:
    forming a leading side rail surface and a trailing side rail surface, a leading stepped bearing surface and a trailing stepped bearing surface, and a negative-pressure groove surface on an air bearing surface through etching;
    forming a first stepped surface on the leading side rail surface through sputtering; and
    forming a second stepped surface by forming a carbon layer on the first stepped surface through sputtering.

2. The method of manufacturing a magnetic head slider according to claim 1,
    wherein the first stepped surface is formed of a silicone layer.

3. The method of manufacturing a magnetic head slider according to claim 1,
    wherein the first stepped surface is formed of another carbon layer.

4. The method of manufacturing a magnetic head slider according to claim 1,
    wherein the first stepped surface has a first height with respect to the leading side rail surface and the second stepped surface has a second height with respect to the first stepped surface; and
    wherein a ratio of the second height of the second stepped surface to the first height of the first stepped surface is about three or less.

5. The method of manufacturing a magnetic head slider according to claim 4,
    wherein the first stepped surface and the second stepped surface have continuity in a direction of the trailing edge.

6. The method of manufacturing a magnetic head slider according to claim 4, wherein a boundary between the first stepped surface and the second stepped surface is situated at a position that falls within the range between about 20% and 90% from a rear end of the first stepped surface.

7. The method of manufacturing a magnetic head slider according to claim 4,
wherein the second stepped surface has, at the boundary between the first stepped surface and the second stepped surface, a U shape or a teeth shape toward a leading edge side.

8. The method of manufacturing a magnetic head slider according to claim 4, further comprising:
forming a third stepped surface having a third height disposed on the second stepped surface.

9. A method of manufacturing a magnetic head slider, comprising:
forming a second stepped surface having a second step on an air bearing surface through etching;
forming a first stepped surface having a first step from a lower portion of the second stepped surface;
forming a leading side rail surface and a trailing side rail surface having a first depth from a lower portion of the first stepped surface; and
forming a negative-pressure groove surface having a second depth from a lower portion of the leading side rail surface and the trailing side rail surface, the second depth being deeper than the first depth, wherein the leading side rail surface is surrounded by a leading stepped bearing surface.

10. The method of manufacturing a magnetic head slider according to claim 9,
wherein the lower portion of the leading side rail surface on a leading edge side includes a leading stepped bearing surface.

11. The method of manufacturing a magnetic head slider according to claim 9,
wherein the first stepped surface has a first height with respect to the leading side rail surface and the second stepped surface has a second height with respect to the first stepped surface; and
wherein a ratio of the second height of the second stepped surface to the first height of the second stepped surface to the first height of the first stepped surface is about three or less.

12. The method of manufacturing a magnetic head slider according to claim 9,
wherein the second stepped surface has, at the boundary between the first stepped surface and the second stepped surface, a U shape or a teeth shape toward a leading edge side.

* * * * *